(12) United States Patent
Girault (10) Patent No.: US 9,930,487 B2
(45) Date of Patent: Mar. 27, 2018

(54) ELECTRONIC DEVICE AND MOVEMENT DISTANCE CALCULATION SYSTEM

(71) Applicant: FURUNO ELECTRIC CO., LTD., Nishinomiya, Hyogo (JP)

(72) Inventor: Florian Girault, Minoh (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 233 days.

(21) Appl. No.: 14/969,792

(22) Filed: Dec. 15, 2015

(65) Prior Publication Data
US 2016/0183054 A1   Jun. 23, 2016

(30) Foreign Application Priority Data

Dec. 22, 2014  (JP) ................. 2014-258185

(51) Int. Cl.
  *H04W 4/02* (2018.01)
  *G01S 19/14* (2010.01)
  *G01S 19/39* (2010.01)

(52) U.S. Cl.
  CPC ............ *H04W 4/023* (2013.01); *G01S 19/14* (2013.01); *G01S 19/39* (2013.01); *H04W 4/028* (2013.01)

(58) Field of Classification Search
  None
  See application file for complete search history.

(56) References Cited

U.S. PATENT DOCUMENTS

| 2003/0124979 A1* | 7/2003 | Tanada | H04W 84/20 455/41.1 |
| 2010/0168942 A1* | 7/2010 | Noffsinger | B61L 3/006 701/21 |
| 2016/0183054 A1* | 6/2016 | Girault | H04W 4/023 455/456.1 |

FOREIGN PATENT DOCUMENTS

JP        2013-079817 A        5/2013

* cited by examiner

*Primary Examiner* — Joseph Schoenholtz
(74) *Attorney, Agent, or Firm* — Studebaker & Brackett PC (57) ABSTRACT

A plotter device measures movement distance of a moving body along with other device belonging to the same network, in which only of the devices belonging to the same network functions as a master, and a device other than the master functions as a slave. This plotter device includes a measurement component, a communication component, and a calculator. The measurement component adds the movement distance while the plotter device is functioning as the master to the master movement distance of the plotter device, and does not add the movement distance while the plotter device is functioning as the slave to the master movement distance of the plotter device.

11 Claims, 4 Drawing Sheets

ELECTRONIC DEVICE AND MOVEMENT DISTANCE CALCULATION SYSTEM

CROSS-REFERENCE TO RELATED APPLICATIONS

This application claims priority to Japanese Patent Application No. 2014-258185 filed on Dec. 22, 2014. The entire disclosure of Japanese Patent Application No. 2014-258185 is hereby incorporated herein by reference.

BACKGROUND

Field

The present disclosure relates mainly to a movement distance calculation system for calculating the movement distance of a moving body using a plurality of electronic devices.

Background Information

Systems made up of a plurality of marine devices belonging to the same network were known in the past. With a system of this type, a configuration is known in which there are a plurality of plotter devices capable of measuring the movement distance of a vessel, and the total movement distance of all of the plotter devices can be ascertained merely by operating one or more of the plotter devices. Japanese Laid-Open Patent Application Publication No. 2013-79817 (Patent Literature 1) discloses a system of this type.

In Patent Literature 1, a plurality of plotter devices belonging to the same network each measure the movement distance of a ship. Each plotter device stores the movement distance along with the time when the measurement started and ended. These plotter-devices also can exchange measured movement distances, start times, and end times. With this configuration, the total movement distance can be calculated by adding up the movement distances so that there is no overlap in duration, on the basis of the start and end times.

SUMMARY

However, with the system in Patent Literature 1, the measured movement distances must be stored so that they are associated with clock time in order to prevent movement distances from being added redundantly, and this ends up making the data complicated. Furthermore, in calculating the total movement distance, the addition has to be performed so as to avoid overlap, and this requires complex processing.

Moreover, this problem is not limited to systems installed on ships, and is also encountered in calculating the total movement distance of any moving body.

The present disclosure was conceived in light of the above situation, and it is a main object thereof to provide a system for calculating the total movement distance of a moving body using a plurality of electronic devices, in which the total movement distance can be calculated by a simple configuration.

A first aspect of the present disclosure provides an electronic device with the following configuration. Specifically, the electronic device is configured to measure movement distance of a moving body along with other device belonging to the same network, in which only one of the electronic device and the other device functions as a master, and a device other than the master functions as a slave. This electronic device comprises a switching component, a measurement component, a communication component, a memory component, and a calculator. The switching component is configured to switch between a state of functioning as the master and a state of functioning as the slave. The measurement component is configured to add the movement distance while the electronic device is functioning as the master to the master movement distance of the electronic device, and is configured not to add (to refrain from adding) the movement distance while the electronic device is functioning as the slave to the master movement distance of the electronic device. The communication component is configured to send the master movement distance of the electronic device to the other device, and is configured to receive master movement distance of the other device. The memory component is configured to store the master movement distances of the electronic device and the other device. The calculator is configured to calculate total movement distance of the moving body by adding up the master movement distances of the electronic device and the other device.

Consequently, only the device that functions as the master measures the movement distance, so the master movement distance is not redundantly measured. Therefore, the total movement distance can be calculated merely by adding up the master movement distances of the various devices, so the amount of computation can be kept low.

With the above-mentioned electronic device, it is preferable if there is provided a display component configured to display the total movement distance calculated by the calculator.

This allows the user to ascertain the total movement distance simply.

With the above-mentioned electronic device, it is preferable if the switching component is configured to cause the electronic device to function as the master when the device in the network with the longest elapsed time since startup is the electronic device.

Thus, the master is determined by comparing the elapsed time after startup, which means that no subsequently actuated device will become the master, which prevents the master from being switched frequently.

With the above-mentioned electronic device, it is preferable if, when the electronic device is newly started up, the communication component is configured to receive the master movement distance from the other device and update the master movement distance stored in the memory component.

Consequently, there is the possibility that immediately after startup an old master movement distance will be stored and the correct total movement distance cannot be calculated, so the correct total movement distance can be calculated by updating as discussed above.

With the above-mentioned electronic device, it is preferable if the following configuration is used. Specifically, the communication component is configured to send the master movement distance of the electronic device to the other device in real time when the electronic device functions as the master. When the electronic device functions as the slave, it is configured to receive the master movement distance of the other device from the other device in real time.

Consequently, since the master movement distance of the device that functions as the master at this point is constantly changing, a more accurate total movement distance can be calculated by updating this value in real time.

With the above-mentioned electronic device, it is preferable if the device is installed on a ship and is configured to calculate the total movement distance of the ship.

Consequently, on ships, navigation devices and the like are installed at a number of locations, and it is often the case that only some of these devices are actuated, so the effect of the present disclosure can be put to particularly good use in such situations.

With the above-mentioned electronic device, when the master movement distance of the other device stored in a memory component of the other device itself is received from the other device itself, the master movement distance of the other device stored in the memory component of the electronic device is updated.

Consequently, the master movement distance of the other device stored by the other device itself will reliably be the most up-to-date information, so the correct total movement distance can be calculated by using this information to update the content of the memory component.

With the above-mentioned electronic device, the following configuration is used. Specifically, at least the electronic device, a first other device, and a second other device are on a network. When master movement distance of the first other device is received from the second other device, the larger of the master movement distance of the first other device stored in the electronic device and the master movement distance of the first other device received form the second other device is used as the master movement distance of the first other device to be stored in the electronic device.

Consequently, the master movement distance will not decrease over time, so the larger value corresponds to the latest master movement distance. Therefore, the latest master movement distance can be stored in the memory component.

A second aspect of the present disclosure provides a movement distance calculation system with the following configuration. This system comprises a plurality of electronic devices that belong to the same network, in which only one electronic device functions as a master, and an electronic device other than the master functions as a slave. Each electronic device includes a switching component, a measurement component, a communication component, a memory component, and a calculator. The switching component is configured to switch between a state of functioning as the master and a state of functioning as the slave. The measurement component is configured to add movement distance while the electronic device is functioning as the master to the master movement distance of the electronic device, and is configured not to add (to refrain from adding) the movement distance while the electronic device is functioning as the slave to the master movement distance of the electronic device. The communication component is configured to send the master movement distance of the electronic device to the other electronic device, and is configured to receive master movement distance of the other electronic device. The memory component is configured to store the master movement distances of the electronic device and the other electronic device. The calculator is configured to calculate total movement distance of the moving body by adding up the master movement distances of the electronic device and the other electronic device.

Consequently, since only the device that functions as the master measures the movement distance, the master movement distance is not measured redundantly. Therefore, the total movement distance can be calculated by simple processing in which the master movement distances of the various devices are merely added up.

BRIEF DESCRIPTION OF THE DRAWINGS

Referring now to the attached drawings which form a part of this original disclosure.

DETAILED DESCRIPTION OF EMBODIMENTS

Figure 1:
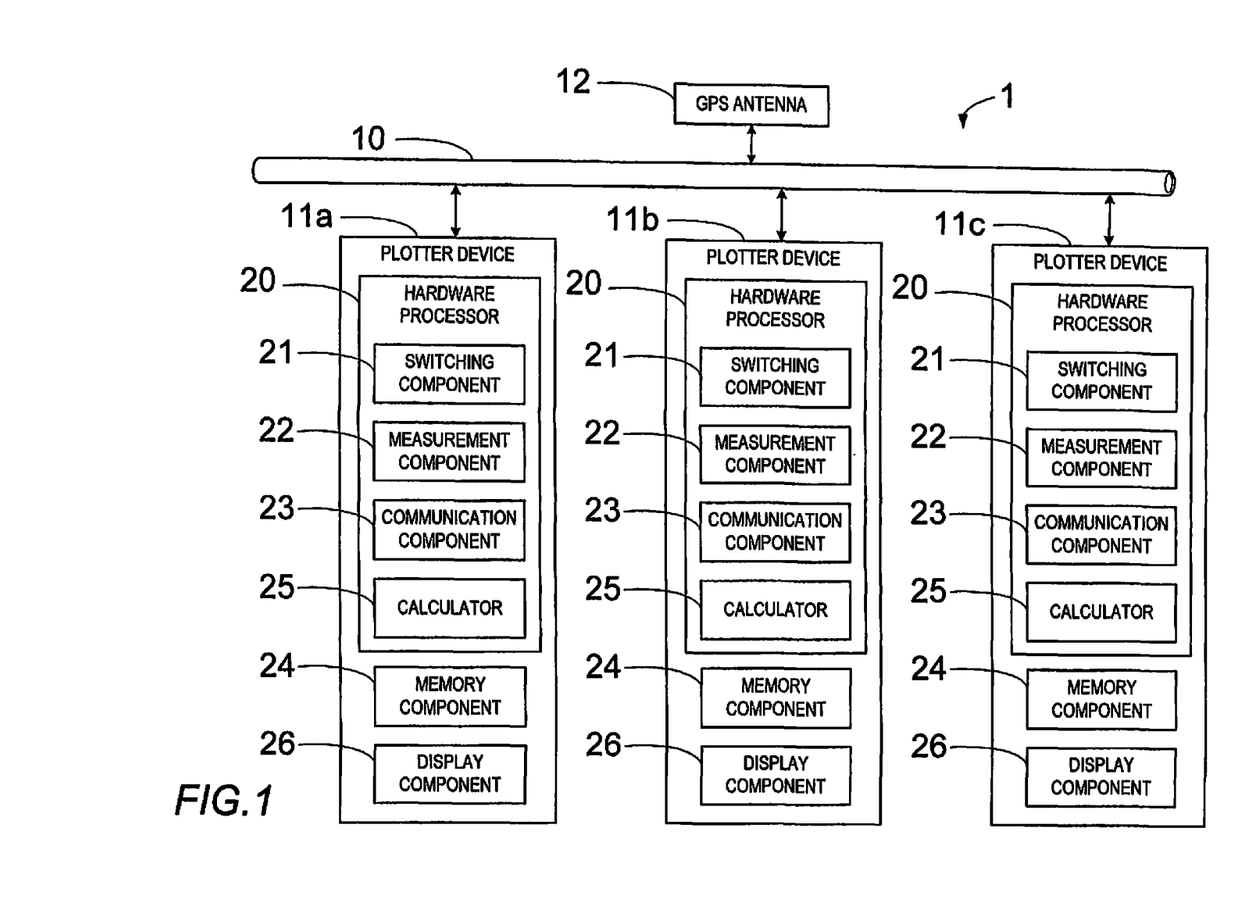
FIG. 1 is a block diagram of the overall configuration of a movement distance calculation system that includes the plotter device pertaining to an embodiment of the present disclosure.

A selected embodiment will now be explained with reference to the drawings. It will be apparent to those skilled in the art from this disclosure that the following descriptions of the embodiment are provided for illustration only and not for the purpose of limiting the present disclosure as defined by the appended claims and their equivalents. First, the configuration of a movement distance calculation system 1 will be described through reference to FIG. 1. FIG. 1 is a block diagram of the overall configuration of the movement distance calculation system 1.

The movement distance calculation system 1 is installed on a ship, and is a system for measuring the total movement distance of the ship. The total movement distance is the total distance the ship on which the movement distance calculation system 1 is installed has moved up to the present time, and is a distance that is not reset even if the ship drops anchor. As shown in FIG. 1, the movement distance calculation system 1 comprises plotter devices (electronic devices) 11a to 11c and a GPS antenna 12.

The plotter devices 11a to 11c and the GPS antenna 12 can exchange measured information and the like through a marine network 10. The standard for the marine network 10 can be, for example, a LAN (local area network) or a CAN (controller area network).

The GPS antenna 12 receives a positioning signal from a GPS satellite (GNSS satellite), and finds the position of the host ship (more precisely, the position of the GPS antenna 12) on the basis of this positioning signal. The GPS antenna 12 outputs the ship's position to the plotter devices 11a to 11c through the marine network 10.

As shown in FIG. 1, the plotter devices 11a to 11c comprise a switching component 21, a measurement component 22, a communication component 23, a memory component 24, a calculator 25, and a display component 26. The plotter devices 11a to 11 c have substantially the same configuration, so just the plotter device 11a will be described below as a representative example. The switching component 21, a measurement component 22, the communication component 23 and the calculator 25 are, for example, implemented on a hardware processor 20 (CPU, FPGA) and a memory (not shown in the figures). For example, by having the processor read a program from the memory and execute the program, it is possible to implement the functions of the switching component 21, a measurement component 22, the communication component 23 and the calculator 25.

The switching component 21 switches between a state in which the plotter device 11a functions as the master and a state in which it functions as a slave. With the movement distance calculation system 1, a single plotter device functions as the master, and all the other plotter devices function as a slave. Therefore, there is always one device in the movement distance calculation system 1 that is the master. Also, all of the plotter devices 11a to 11c could be a master, or they could be a slave.

Any method may be used to determine the master, but in this embodiment the system is set up so that the plotter device with the longest elapsed time since startup functions as the master. Once the plotter device that functions as the master stops (its power is turned off), the plotter device that has been running for the next longest time is chosen to function as the master. In addition to using the elapsed time since startup, the master may also be determined by MAC address order, for example.

The measurement component 22 measures the movement distance of the host vessel on the basis of the change in position of the host vessel received from the GPS antenna 12. The movement distance calculation system 1 is configured so that only the plotter device that functions as the master measures the movement distance, so the movement distance is never measured redundantly. If the plotter device 11a functions as the master, the measured movement distance is added to the "master movement distance of the plotter device 11a." If the plotter device 11a functions as a slave, the "master movement distance of the plotter device 11a" remains constant. Therefore, with the movement distance calculation system 1, only the master movement distance of the plotter device that functions as the master as added.

The communication component 23 sends the master movement distance of the plotter device 11a to the other plotter devices 11b and 11c, and also receives the master movement distance of the plotter devices 11b and 11c from the other plotter devices 11b and 11c. More specifically, the communication component 23 communicates with the other plotter devices 11b and 11c after the startup of the plotter device 11a is complete, and the devices update their master movement distances among each other (the update processing will be discussed in detail below). Also, if at least the host device functions as a master, the plotter device 11a sends the master movement distance of the host device (the plotter device 11a) to the other plotter devices 11b and 11c in real time. The term real time here encompasses not only when the master movement distance is sent immediately after being updated, but also when the master movement distance is sent at short time intervals.

The memory component 24 is a nonvolatile memory, and stores a master movement distance for every plotter device. More specifically, the memory component 24 individually stores the master movement distance of the host device (the plotter device 11a), the master movement distance of the plotter device 11b, and the master movement distance of the plotter device 11c.

The calculator 25 calculates the total movement distance of the ship by adding up the master movement distances for all the plotter devices stored in the memory component 24. As discussed above, with the movement distance calculation system 1, there is one master, and only the master measures the movement distance, so the total movement distance of the ship can be calculated merely by adding up the master movement distances of the plotter devices 11a to 11c.

The display component 26 is constituted by a liquid crystal display or the like, and displays, for example, the position of the host vessel on a sea chart, points set by the user, etc. The display component 26 also displays the total movement distance of the ship calculated by the calculator 25, either constantly or at the user's command.

The processing to determine whether or not to update when a master movement distance has been received from another plotter device will now be described through reference to FIG. 2.

As discussed above, the plotter devices 11a to 11c receive master movement distances from the other plotter devices in real time or at startup. The plotter devices 11a to 11c basically update the content stored in the memory component 24 by using the received master movement distances. However, since it is conceivable that an old master movement distance will be received, in this embodiment the flowchart in FIG. 2 is used to determine whether or not to update.

More specifically, when the plotter devices 11a to 11c receive a master movement distance from another plotter device 11x (x=a, b, or c) (S101), they determine whether or not the received master movement distance is the plotter device 11x's own master movement distance (S102). If the master movement distance of the plotter device 11x was received from the plotter device 11x (Yes in S102), then the plotter devices 11a to 11c update the content stored in the memory component 24 with the received master movement distance (S103).

On the other hand, if the master movement distance of another plotter device was received from the plotter device 11x (No in S102), then this master movement distance may not be the most up-to-date. Therefore, the plotter devices 11a to 11c determine whether or not the received master movement distance is greater than the master movement distance in the memory component 24 (S104). Since the master movement distance will always increase as long as the total movement distance has not been reset, if the received master movement distance is greater (Yes in S104), the content stored in the memory component 24 is updated with the received master movement distance (S103). If the received master movement distance is smaller (No in S104), then the master movement distance stored in the memory component 24 is new, so the content stored in the memory component 24 is not updated (S105).

Figure 3:
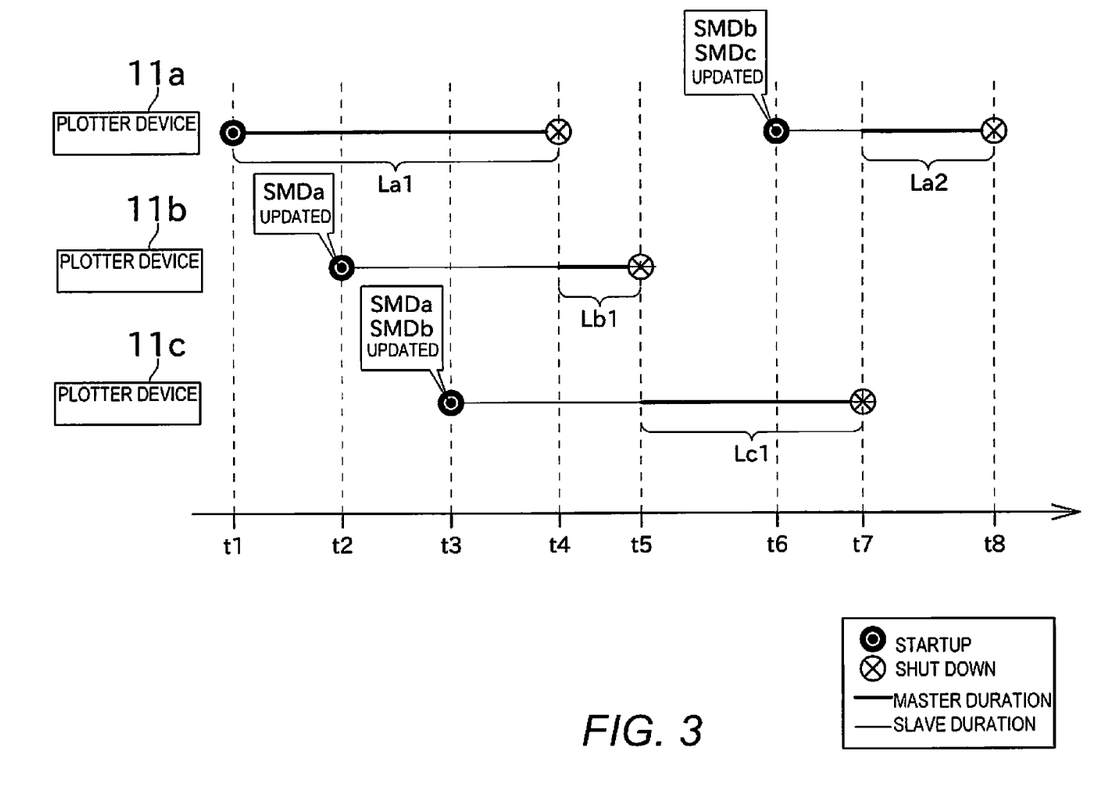
FIG. 3 is a diagram of the operational situation of various plotter devices when the plotter devices are actuated at a time differential.
Figure 4:
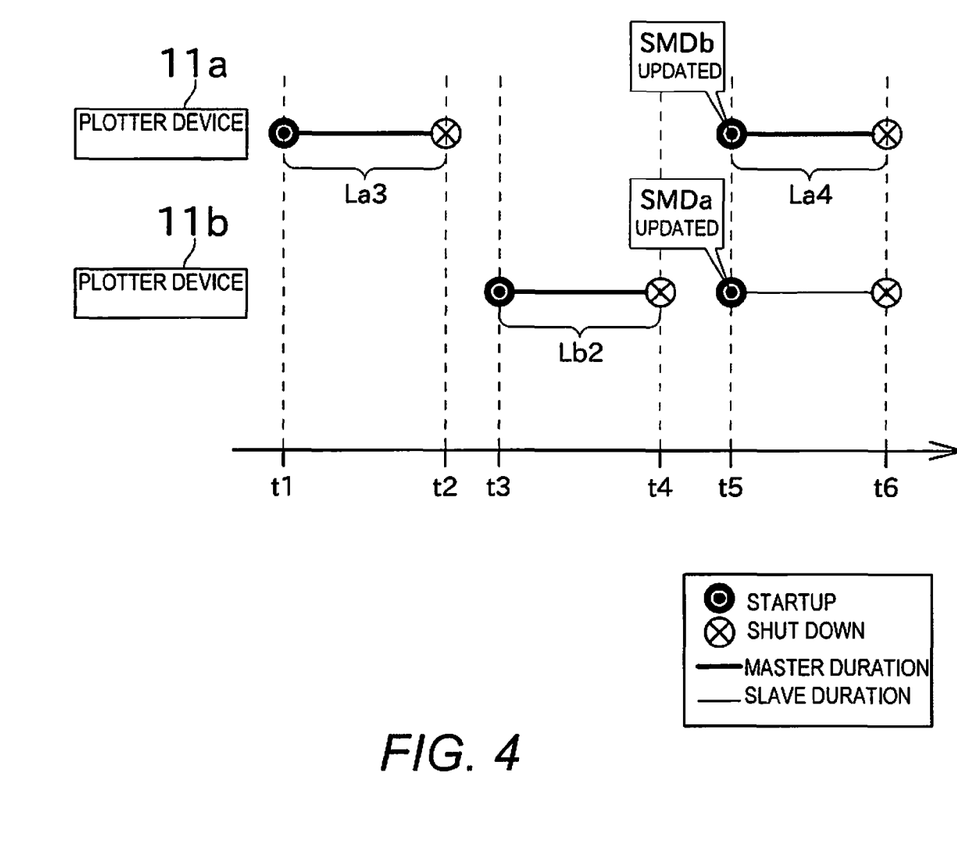
FIG. 4 is a diagram of the operational situation of various plotter devices when the plotter devices are actuated individually.

The processing performed by the plotter devices 11a to 11c when the plotter devices 11a to 11c are started up or shut down at a certain timing will now be described through reference to FIG. 3. In FIGS. 3 and 4, the master movement distance is given as SMD (self-master traveled distance), and the master movement distance of the plotter device 11a is given as SMDa, etc.

Let us now describe when the plotter device 11a, the plotter device 11b, and the plotter device 11c start up and shut down in order, and the plotter device 11a starts up again, as shown in FIG. 3. To simplify the description, let us assume that the total movement distance of the ship was reset just before a clock time t1.

The plotter device 11a starts up at the time t1. Since the other plotter devices are not running at the point when the plotter device 11a starts up, the plotter device 11a functions as the master. Therefore, the plotter device 11a measures the movement distance of the ship and continues to add it to the master movement distance of the plotter device 11a and store this in the memory component 24. The period between the time t1 and the time t2 is the total movement distance=SMDa+SMDb+SMDc=SMDa.

At the time t2, the plotter device 11b starts up. Once the startup of the plotter device 11b is complete and it has been connected to the marine network 10, the other plotter device 11a is notified to this effect. In this embodiment, since the master is determined on the basis of the length of time elapsed since startup, the plotter device 11a then functions as the master, and the plotter device 11b functions as a slave. The plotter device 11b receives the master movement distance of the plotter device 11a from the plotter device 11a. After this, the plotter device 11a sends the master movement distance added up over the movement of the ship to the plotter device 11b in real time. The period between the time t2 and the time t3 is the total movement distance=SMDa+SMDb+SMDc=SMDa.

At the time t3, the plotter device 11c starts up. Once the startup of the plotter device 11c is complete and it has been connected to the marine network 10, the other plotter devices 11a and 11b are notified to this effect. After the plotter device 11c starts up, the plotter device 11a functions as the master, and the plotter device 11c functions as a slave. The plotter device 11c receives the master movement distances of the plotter devices 11a and 11b from these devices. After this, the plotter device 11a sends the master movement distance added up over the movement of the ship to the plotter devices 11b and 11c in real time. The period between the time t3 and the time t4 is the total movement distance=SMDa+SMDb+SMDc=SMDa.

At the time t4, the operation of the plotter device 11a ends. Since the plotter device 11a functions as the master, the next master is determined. In the example shown in FIG. 2, the elapsed time since startup is longer for the plotter device 11b than for the plotter device 11c, so the plotter device 11b functions as the new master. The plotter device 11b sends the master movement distance added up over the movement of the ship to the plotter device 11c in real time. The period between the time t4 and the time t5 is the total movement distance=SMDa+SMDb+SMDc=La1+SMDb. La1 here is the movement distance of the ship measured by the plotter device 11a between the time t1 and the time t4.

At the time t5, the operation of the plotter device 11b ends. Accordingly, the remaining plotter device 11c functions as the master. The period between the time t5 and the time t6 is the total movement distance=SMDa+SMDb+SMDc=La1+Lb1+SMDc. Lb1 here is the movement distance of the ship measured by the plotter device 11b between the time t4 and the time t5.

At the time t6, the plotter device 11a starts up again. Since the operating time after startup is longer for the plotter device 11c, the plotter device 11a functions as a slave. The plotter device 11a receives the master movement distances of the plotter devices 11b and 11c from the plotter device 11c. The plotter device 11a receives the master movement distance of the plotter device 11b from the plotter device 11c, but since Lb1 is added to this master movement distance, it is greater than the master movement distance of the plotter device 11b stored by the plotter device 11a. Therefore, the plotter device 11a updates the master movement distance of the plotter device 11b that it stores itself on the basis of information from the plotter device 11c. The period between the time t6 and the time t7 is the total movement distance=SMDa+SMDb+SMDc=La1+Lb1+SMDc.

At the time t7, the operation of the plotter device 11c ends. Accordingly, the plotter device 11a functions as the master. The period between the time t7 and the time t8 is the total movement distance=SMDa+SMDb+SMDc=SMDa+Lb1+Lc1. Lc1 here is the movement distance of the ship measured by the plotter device 11c between the time t5 and the time t7. After this, the operation of the plotter device 11a ends at the time t8.

Thus, in this embodiment, since only the plotter device 11a to 11c functioning as the master measures the movement distance, the total movement distance can be calculated merely by adding up the master movement distances of the plotter devices 11a to 11c. Also, since the master movement distance is shared by the plotter devices 11a to 11c as long as they are connected to the marine network 10, all of the plotter devices 11a to 11c can display the total movement distance.

The benefits to sharing the master movement distance, rather than sharing the total movement distance, will now be described through reference to FIG. 4.

In the example shown in FIG. 4, during the period between the time t1 and the time t2 only the plotter device 11a has been started up, during the period between the time t3 and t4 only the plotter device 11b has been started up, and at the time t5 the plotter device 11a and the plotter device 11b have been started up.

When only the total movement distance is shared, for example, at the time t5 the total movement distance ascertained by the plotter device 11a is the "total movement distance prior to the time t1+La3." Meanwhile, at the time t5, the total movement distance ascertained by the plotter device 11b is the "total movement distance prior to the time t1+Lb2." In this case, the total movement distance cannot be calculated accurately even though the plotter device 11a and the plotter device 11b have both been started up.

On the other hand, when the master movement distance is shared as in this embodiment, at the time t5 the plotter device 11a updates the master movement distance of the plotter device 11b (adds Lb2 to SMDb), and the plotter device 11b updates the master movement distance of the plotter device 11a (adds La3 to SMDa). This allows the total movement distance to be calculated accurately.

As described above, the plotter devices 11a to 11c in this embodiment measure the movement distance of a ship along with other plotter devices belonging to the same marine network 10, in which only one of the host device and the other plotter devices functions as the master, and the plotter devices other than the master functions as a slave. Each plotter device comprises the switching component 21, the measurement component 22, the communication component 23, the memory component 24, the calculator 25. The switching component 21 switches between a state of functioning as a master and a state of functioning as a slave. The measurement component 22 adds the movement distance while the host device is functioning as a master to the master movement distance of the host device, and does not add the movement distance while the host device is functioning as a slave to the master movement distance of the host device. The communication component 23 sends the master movement distance of the host device to the other plotter devices, and receives the master movement distance of the other plotter devices. The memory component 24 stores the master movement distances of the host device and the other plotter devices. The calculator 25 calculates the total movement distance of the ship by adding up the master movement distances of the host device and the other plotter devices.

Consequently, only the plotter device that functions as the master measures the movement distance, so the master movement distance is not measured redundantly. Therefore, the total movement distance can be calculated merely by adding up the master movement distances for the various plotter devices, which keeps the amount of computation low.

A preferred embodiment of the present disclosure was described above, but the above configuration can be modified as follows, for example.

There may be only two plotter devices in the movement distance calculation system 1, or there may be four or more.

This embodiment is configured so that the plotter devices measure movement distance, but the present disclosure can also be applied to other devices (GPS devices, ship speed meters, etc.).

In the above embodiment, an example of using GPS was described as an example of GNSS, but some other configuration in which GNSS is used may also be used, of course.

Figure 2:
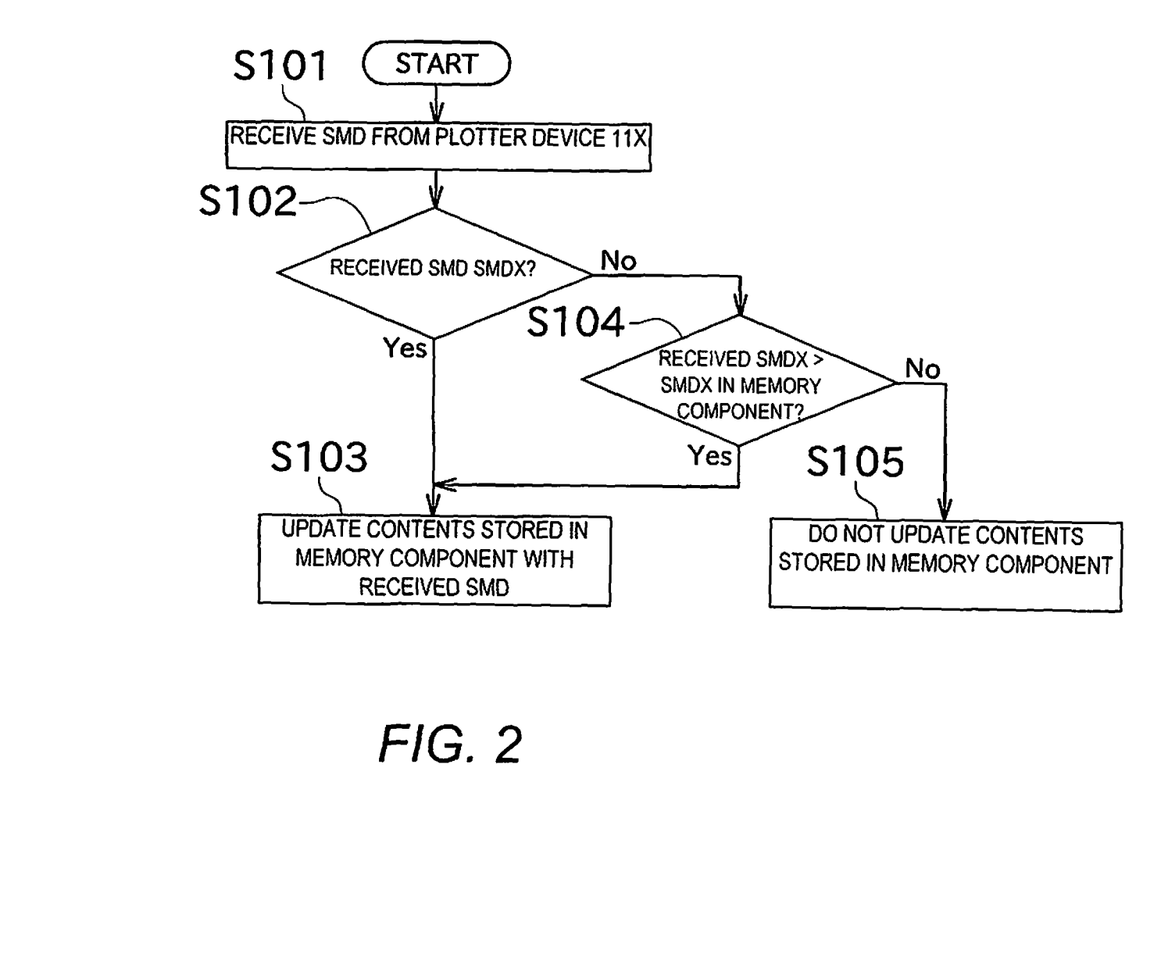
FIG. 2 is a flowchart of the processing to determine whether or not to update upon receiving master movement distance.

In the above embodiment, whether or not the master movement distance is the most up-to-date is determined by the processing shown in the flowchart of FIG. 2, but the configuration may instead be such that the update time is stored along with the master movement distance, and the master movement distance with the most recent update time is stored preferentially.

The moving body whose movement distance is measured is not limited to being a ship, and may instead be an aircraft, an automobile, or the like, for example. Also, the method for calculating the movement distance is not limited to using GNSS. For instance, when the present disclosure is applied to an automobile, the movement distance can be calculated by a suitable method such as using a pulse signal generated in proportion to the rotational speed of the axle.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A plotter device configured to measure movement distance of a moving body along with an other plotter device belonging to the same network, in which only one of the plotter device and the other plotter device functions as a master, and the plotter device and the other plotter device different than the master functions as a slave, the plotter device comprising:
processing circuitry configured to:
determine a timing relationship of a most current startup time of the plotter device with respect to a most current startup time of the other plotter device;
switch operation of the plotter device between a state of functioning as the master and a state of functioning as the slave based on a condition of the timing relationship,
add the movement distance while the plotter device is functioning as the master to master movement distance of the plotter device,
refrain from adding the movement distance while the plotter device is functioning as the slave to the master movement distance of the plotter device,
send the master movement distance of the plotter device to the other plotter device,
receive the master movement distance of the other plotter device, and
calculate total movement distance of the moving body by adding up the master movement distances of the plotter device and the other plotter device; and
a memory configured to store the master movement distances of the plotter device and the other plotter device.

2. The plotter device according to claim 1, further comprising
a display component configured to display the total movement distance calculated by the processing circuitry.

3. The plotter device according to claim 1, wherein the processing circuitry is further configured to:
cause the plotter device to function as the master when the device in the network with the longest elapsed time since startup is the plotter device.

4. The plotter device according to claim 1, wherein the processing circuitry is further configured to:
receive the master movement distance from the other plotter device and update the master movement distance stored in the memory component when the plotter device is newly started up.

5. The plotter device according to claim 1, wherein the processing circuitry is further configured to:
send the master movement distance of the plotter device to the other plotter device in real time when the plotter device functions as the master, and
receive the master movement distance of the other plotter device from the other plotter device in real time when the plotter device functions as the slave.

6. The plotter device according to claim 1, which is installed on a ship that is the moving body, the processing circuitry is further configured to:
calculate the total movement distance of the ship.

7. The plotter device according to claim 1, the processing circuitry is further configured to:
update the master movement distance of the other plotter device stored in the memory component of the plotter device when the master movement distance of the other plotter device stored in a memory component of the other plotter device itself is received from the other plotter device itself.

8. The plotter device according to claim 1, wherein
at least the plotter device, a first other plotter device, and a second other plotter device are on a network, and
when master movement distance of the first other plotter device is received from the second other plotter device, the larger of the master movement distance of the first other plotter device stored in the plotter device and the master movement distance of the first other plotter device received form the second other plotter device is used as the master movement distance of the first other plotter device to be stored in the plotter device.

9. A movement distance calculation system comprising:
a plurality of plotter devices that belong to the same network, in which only one plotter device functions as a master, and a plotter device other than the master functions as a slave, each plotter device including
processing circuitry configured to:
determine a timing relationship of a most current startup time of the plotter device with respect to a most current startup time of the other plotter device;
switch operation of the plotter device between a state of functioning as the master and a state of functioning as the slave based on a condition of the timing relationship,
add movement distance while the plotter device is functioning as the master to master movement distance of the plotter device,
refrain from adding the movement distance while the plotter device is functioning as the slave to the master movement distance of the plotter device,
send the master movement distance of the plotter device to the other plotter device,
receive the master movement distance of the other plotter device, and
calculate total movement distance of moving body by adding up the master movement distances of the plotter device and the other plotter device; and
a memory component configured to store the master movement distances of the plotter device and the other plotter device.

10. The plotter device according to claim 1, wherein
the processing circuitry is configured to determine the timing relationship of the most current startup time of the plotter device with respect to the most current startup time of the other plotter device and the most current shut down time of the other plotter device.

11. The movement distance calculation system according to claim 9, wherein
the processing circuitry is configured to determine the timing relationship of the most current startup time of the plotter device with respect to the most current startup time of the other plotter device and the most current shut down time of the other plotter device.

* * * * *